(12) United States Patent
Kim et al.

(10) Patent No.: US 7,682,437 B2
(45) Date of Patent: Mar. 23, 2010

(54) TRANSPARENT SOLID MARKER

(75) Inventors: Hak-Jae Kim, Daejeon (KR); Han-Shin Jung, Daejeon (KR)

(73) Assignee: Dong-A Teaching Materials Co., Ltd., Daejeon (KR)

( * ) Notice: Subject to any disclaimer, the term of this patent is extended or adjusted under 35 U.S.C. 154(b) by 0 days.

(21) Appl. No.: 12/470,235

(22) Filed: May 21, 2009

(65) Prior Publication Data
US 2009/0293767 A1  Dec. 3, 2009

(30) Foreign Application Priority Data
May 28, 2008  (KR) .................. 10-2008-0049797

(51) Int. Cl.
*C09D 13/00* (2006.01)
*C09D 5/06* (2006.01)
(52) U.S. Cl. ............... 106/31.94; 106/31.07; 106/31.11
(58) Field of Classification Search ............. 106/31.07, 106/31.11, 31.94
See application file for complete search history.

(56) References Cited

U.S. PATENT DOCUMENTS

2002/0106385 A1* 8/2002 Vatter et al. .................. 424/401
2008/0249192 A1* 10/2008 Goget et al. ................. 514/786

FOREIGN PATENT DOCUMENTS

| JP | 01-217090 A | 8/1989 |
|---|---|---|
| JP | 04-337372 A | 11/1992 |
| JP | 05-311107 A | 11/1993 |

\* cited by examiner

*Primary Examiner*—Jerry Lorengo
*Assistant Examiner*—Veronica Faison Gee
(74) *Attorney, Agent, or Firm*—Knobbe Martens Olson & Bear LLP

(57) ABSTRACT

There is provided a transparent solid marker that has high bending strength and low writing resistance as stick-formed goods, is difficult to break or bend, generates few remnants while coating is carried out, and does not cause spreading of a writing surface even if it is coated on a surface which is written on by oily or aqueous writing implements. There is provided a transparent solid marker that is obtained by heating and mixing a composition including a gel forming material that includes an alkali metal salt or ammonium salt of an aliphatic carboxylic acid having 8 to 36 carbon atoms, a transparency agent, a subsidiary transparency agent, hydrogenated glucose syrup, a basic pigment, and oil, and cooling it.

19 Claims, 1 Drawing Sheet

TRANSPARENT SOLID MARKER

CROSS TO REFERENCE TO RELATED APPLICATION

This application claims priority to and the benefit of Korean Patent Application No. 10-2008-0049797 filed in the Korean Intellectual Property Office on May 28, 2008, the entire contents of which are incorporated herein by reference.

BACKGROUND OF THE INVENTION (a) Field of the Invention

The present invention relates to a solid portrayal material. More particularly, the present invention relates to a transparent solid marker that maintains the sense of smooth writing, is difficult to break or bend, is used for portrayal using a pastel crayon or a pastel, and in particular, is used to mark an important portion since it has a fluorescent color.

(b) Description of the Related Art

In general, since a pastel crayon uses wax such as paraffin as a solidifying agent, writing resistance is high, and since a coated surface is not cured, defects such as stains or discoloration occur. In addition, it is impossible to make the content thereof transparent.

Meanwhile, a pastel does not include wax and oil and is a low concentration aqueous adhesive component that is obtained by solidifying powders such as pigments and the like to form a stick shape (rod shape). Since it is not attached to paper, it is necessary to fix the color by spraying a specific fixing solution with respect to written lines. In addition, the pastel spreads powder to contaminate the surroundings. Further, it is impossible to make the contents of the pastel transparent.

In order to avoid these problems, an aqueous gel stick solid portrayal material in which an alkali metal salt or an ammonium salt of aliphatic carboxylic acid is used as a gelating agent has been proposed. For example, Japanese Patent Laid-Open Publication Nos. H05-311107, H04-337372, and H01-217090 disclose related technologies.

However, in the disclosed known solid portrayal material, stick strength is weak as compared to a wax-type crayon, and it is easy to break or bend in use. In this case, if a mixing ratio of the gelating agent is increased, it is possible to increase hardness, but softness as the stick is reduced and it is easily bent. In addition, the sense of smooth writing is reduced and remnants occur after writing. Moreover, fluidity of a sol is reduced and shaping is difficult in manufacturing.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a transparent solid marker that has high stick strength compared to known products, and particularly has low writing resistance (smooth sense of writing), is difficult to break or bend, generates few remnants after writing, does not cause spreading of the writing surface even if it is coated on a surface that is written on by oily or aqueous writing implements, and has transparent contents.

A solid portrayal material according to the present invention is obtained by heating and mixing a compound that includes a gel forming material that includes an alkali metal salt or ammonium salt of an aliphatic carboxylic acid having 8 to 36 carbon atoms, a transparency agent, a subsidiary transparency agent, hydrogenated glucose syrup, a basic pigment, and oil, and cooling it.

As the transparency agent, a compound that includes alkoxylated nitrogen may be used, and as the subsidiary transparency agent, saccharides, glycols, polyalcohols, and the like may be used.

It is preferable that the compound that includes alkoxylated nitrogen, which is the transparency agent, is an aliphatic amino alcohol.

As the aliphatic amino alcohol, it is preferable that one or more selected from ethanolamine, diethanolamine, triethanolamine, dimethylethanolamine, isopropanolamine, triisopropanolamine, isobutanolamine, and the like are used.

In the composition, the transparency agent depends on the kind of pigment, but it is preferable that the compound that includes the alkoxylated nitrogen is included in the range of 1 to 10 wt %.

It is preferable that as saccharides that are the subsidiary transparency agent, sugar, sorbitol, starch syrup, and the like are used, as glycols, ethylene glycol, propylene glycol, glycerine, and the like are used, and as polyalcohols, polyhydric alcohols and the like are used. It is preferable that the subsidiary transparency agent is included in the range of 5 to 30 wt %.

It is preferable that the hydrogenated glucose syrup uses a syrup that is obtained by decomposing starch using an enzyme and reducing it through hydrogenation.

According to the transparent solid marker of the present invention, stick-formed goods are difficult to break or bend, have low writing resistance, generate few remnants after writing, and do not cause spreading of the writing surface even if they are coated on a surface that is written on by oily or aqueous writing implements.

DETAILED DESCRIPTION OF THE EMBODIMENTS

Figure 1:
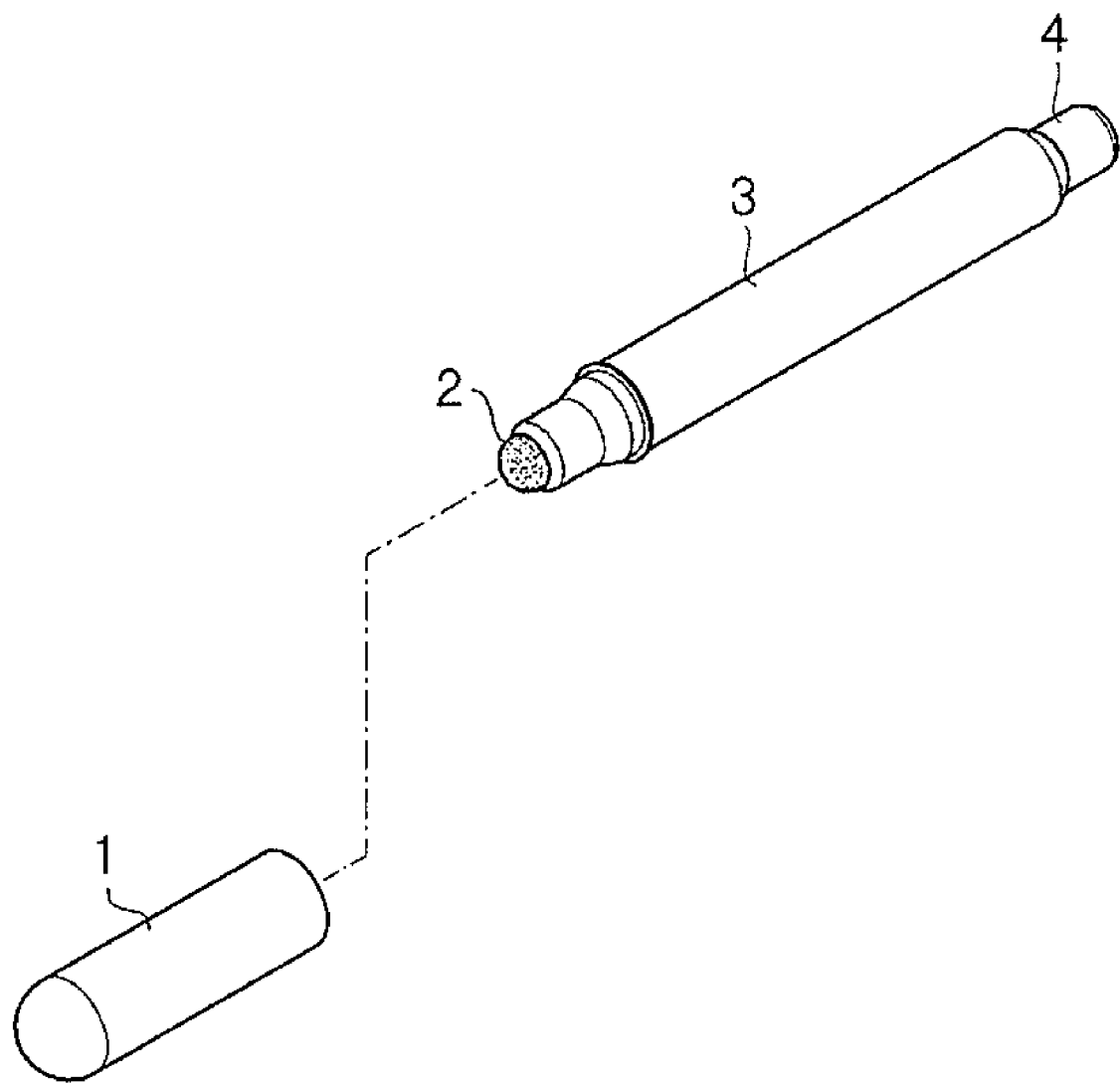
FIG. 1 is a perspective view that illustrates a state in which an exemplary embodiment of a transparent solid marker according to the present invention is inserted into a screw-type holder.

Hereinafter, preferred embodiments of the transparent solid marker according to the present invention are described in detail, and they are set forth to illustrate but are not to be construed to limit the present invention.

Gel Forming Material

The gel forming material that is used in an exemplary embodiment according to the present invention includes an alkali metal salt or ammonium salt of an aliphatic carboxylic acid having 8 to 36 carbon atoms.

The aliphatic carboxylic acid is an alkali metal salt or ammonium salt of an aliphatic carboxylic acid having 8 to 36 carbon atoms, which includes or does not include branches, and particularly, the aliphatic carboxylic acid preferably has 12 to 18 carbon atoms.

Examples of the aliphatic carboxylic acid that constitutes the aliphatic carboxylic acid salt may include a capril acid, a peralgonic acid, a wandicanic acid, a lauric acid, a myristeric acid, a palmitic acid, a stearic acid, an arakinic acid, a behenic acid, a ligenoceric acid, a cerotic acid, a montanic acid, a mericinic acid, and the like.

In addition, examples of the alkali metal salt of the aliphatic carboxylic acid include lithium salts, sodium salts, potassium salts, and the like, and particularly, sodium myristerate, sodium palmitate, sodium stearate, or mixtures thereof are preferable.

The mixing ratio of the aliphatic carboxylic acid salt is preferably 10 to 70 wt % and more preferably 15 to 60 wt % in the total raw material composition when the solid portrayal material according to the present invention is manufactured.

The above mixing ratio is preferable in that if the amount of the aliphatic carboxylic acid salt is 10 wt % or more, the solid portrayal material is easily made hard, and it is useful in terms of formation of a gel. In addition, the strength of the stick-formed goods may be improved. Meanwhile, by setting the amount to 70 wt % or less, in the course of manufacturing it, when it is heated and mixed, melting of the aliphatic carboxylic acid salt is easily carried out, remnants after writing are generated in a small amount, writing resistance is reduced, and fluidity in shaping is improved, such that shaping is easily carried out.

(2) Compound that Includes Alkoxylated Nitrogen, which is Transparency Agent

In the transparency solid marker according to the present invention, if the compound that includes alkoxylated nitrogen is mixed with the raw material composition, it is possible to make the content thereof transparent.

As the added compound that includes alkoxylated nitrogen, an aliphatic amino alcohol, an alicyclic amino alcohol, an aromatic amino alcohol, and the like may be illustrated. Among them, an aliphatic amino alcohol is preferable, and it is preferable that it is in a liquid state at room temperature.

As the aliphatic amino alcohol, formulas that are represented by $R_1 2NR_2OH$, $R_1N(R_3OH)_2$, $N(R_4OH)_3$, and the like may be illustrated, and when a plurality of $R_1$ are present in one compound at an alkyl group having 1 to 6 hydrogen atoms and having 1 to 6 carbon atoms, they may be the same as each other or different from each other. $R_2OH$, $R_3OH$, and $R_4OH$ are each an alkoxyl group having 1 to 6 carbon atoms or a group that is represented by —$R_5OR_6OH$ (here, $R_5$ and $R_6$ are each an alkylene group, and the number of carbon atoms of $R_5$ and $R_6$ is in the range of 2 to 10), and when the number thereof is plural in one compound, they may be the same as each other or different from each other.

Examples of the aliphatic amino alcohol may include ethanolamine, diethanolamine, triethanolamine, dimethylethanolamine, isopropanolamine, diisopropanolamine, triisopropanolamine, isobutanolamine, N,N-diethylethanolamine, N,N-dibutylethanolamine, N-methyl-N,N-diethanolamine, dimethylisopropanolamine, methylethanolamine, aminoethylethanolamine, ethyldiethanolamine and N,N-diisopropylethanolamine, and one or more selected from them. However, among them, it is particularly preferable to use ethanolamine, diethanolamine, triethanolamine, dimethylethanolamine, isopropanolamine, triisopropanolamine, and isobutanolamine.

The amount of the used compound that includes alkoxylated nitrogen is preferably 2 to 30 wt %, more preferably 5 to 20 wt %, and particularly preferably 3 to 15 wt % in the total raw material composition of the transparency solid marker according to the present invention.

If the amount of the used compound that includes alkoxylated nitrogen is 2 wt % or less, the transparency of the content thereof is reduced, and if the amount of the used compound that includes alkoxylated nitrogen is 30 wt % or higher, a problem in which spread occurs on a written surface that is written on by the oily writing implements.

(3) Subsidiary Transparency Agent

In the transparent solid marker according to the present invention, if the raw material composition is mixed with the subsidiary transparency agent compound, it is possible to increase the transparency of the content thereof.

As the added subsidiary transparency agent compound, as saccharides, sugar, sorbitol, starch syrup, and the like may be illustrated, as glycols, ethylene glycol, propylene glycol, glycerine, and the like may be illustrated, and as polyalcohols, polyhydric alcohols and the like may be illustrated.

The mixing ratio of the subsidiary transparency agent is preferably 2 to 30 wt % and more preferably 5 to 20 wt % in the total raw material composition when the transparent solid marker according to the present invention is manufactured.

(4) Hydrogenated Glucose Syrup

In the transparent solid marker according to the present invention, if the raw material is mixed with the hydrogenated glucose syrup, it is possible to prevent spreading of the written surface that is written on by the writing implements.

The hydrogenated glucose syrup is obtained by hydrogenating (reducing) various starch syrups that are obtained by decomposing starch using enzymes, and may be used in foods, sweeteners, crystal prevention agents, gloss promoting agents, and the like.

If the starch is decomposed, since saccharides having various degrees of polymerization are generated, it is difficult to isolate specific polysaccharides and it is used as a saccharide mixture. As the saccharide composition, a mixture that includes polysaccharides of disaccharides as a main component (for example, at 85 wt % or more), or a hydrogenated glucose syrup that includes disaccharides to octasaccharides as a main component is preferable. Since monosaccharides and disaccharides have high absorptivity, formation of a dried coat may be insufficient, which is undesirable. Since the saccharides have a high molecular weight, moisture absorptivity is reduced and it is easy to form the dried coat. In addition, properties such as heat resistance, acid resistance, microorganism resistance, and the like are improved, and they may be stably maintained in the solid portrayal material. In addition, it is preferable that the amount of the solid is 60 wt % or more.

In addition, as a commercial hydrogenated glucose syrup, HS-20, HS-30, HS-40 (trademark: manufactured by HAYASHIBARA SHOJI, Inc. in Japan), PO-20, PO-30, PO-40, PO-60, PO-300, PO-500 (trademark: manufactured by TOWA-KASEI, Co., Ltd. in Japan) and the like are provided.

The amount of the used hydrogenated glucose syrup is preferably 1 to 30 wt % and more preferably 2 to 25 wt % in the total raw material composition of the solid portrayal material according to the present invention. If the amount of the hydrogenated glucose syrup is 1 wt % or less, the spreading phenomenon of the written surface temporally occurs, and if the amount of the hydrogenated glucose syrup is 30 wt % or more, the coated surface is sticky.

(5) Pigment

In the transparent solid marker according to the present invention, the used basic pigment is not particularly limited. As the basic pigment, for example, Basic Yellow 40, Basic Red 1, Basic Red 59, Basic Red 11, Basic Violet 10, Basic Violet 26, Basic Violet 11, Basic Violet 16, Basic Green 7, and the like are used.

The amount of the used basic pigment is preferably 0.1 to 10 wt % and more preferably 0.2 to 8 wt % in the total raw material composition of the transparency solid marker according to the present invention.

(6) Oil

In the transparency solid marker according to the present invention, if oil is mixed with the raw material composition, since a releasing property of the content received in the screw-type holder is excellent, operability is good and it is possible to prevent a sticky property of the coated surface and attachment to a user's hands when coating is performed.

The oil that is used in the transparent solid marker according to the present invention is in a liquid phase at 0° C. or higher, and as the above oil, silicon oil, an oily ester compound, vegetable tallow, mineral oil, and the like may be used.

The amount of the used oil is preferably 2.0 to 3.0 wt % and more preferably 5 to 20 wt % in the total raw material composition of the transparency solid marker according to the present invention.

(7) Manufacturing of the Transparency Solid Marker

The manufacturing method of the transparent solid marker according to the present invention is not particularly limited, but, for example, the marker may be manufactured by adding a gel forming material, a transparency agent, a subsidiary transparency agent, a hydrogenated glucose a syrup, a basic pigment, and an oil to a vessel that is equipped with an agitator and a thermocouple, heating and mixing them, injecting the material that is obtained by melting into a mold, and cooling it. In this case, the order of addition of each component is not particularly limited.

As a more detailed preparation example, components having a predetermined ratio are added to a vessel that is equipped with an agitator and a thermocouple, agitated, refluxed, heated at 90° C., and mixed. It may be manufactured by injecting the melted material into a screw-type holder, and cooling and solidifying it, or injecting a rod that is cooled and solidified or extrusion molded into a cap-attached sealing vessel.

The solid portrayal material according to an exemplary embodiment of the present invention can largely improve stick strength as compared to known products, reduces writing resistance, is difficult to break or bend, hardly generates remnants after writing, does cannot cause spreading of the writing surface even though it is coated on a surface that is written on by oily or aqueous writing implements, and has transparent contents.

Next, the transparent solid marker according to an exemplary embodiment of the present invention is provided in practice as a solid portrayal material 2 that is received in the screw-type holder 3 as shown in FIG. 1. In FIG. 1, reference numeral 4 indicates a handle for screwing, and reference numeral 1 indicates a cap for preventing drying.

[Evaluation Method]

The shaped transparent solid marker according to an exemplary embodiment of the present invention (cylinder having length of 50 mm and diameter of 11 mm) was extracted from the constant temperature chamber at 50° C., and left at room temperature for 2 hours, and the following evaluation was carried out.

Remnants After Writing

A freesheet paper was fixed on a balance, and a line having a length of 10 cm was drawn while writing pressure was controlled such that the writing pressure was in the range of 3 N (306 gf) to 4 N (408 gf) which was measured by the balance. Particle remnants after writing were observed by the naked eye.

[○]: the number of particles that are capable of being confirmed by the naked eye is one or less.

[×]: many particles are observed by the naked eye.

(b) Writing Resistance

A paraffin paper having a size of 90×90 mm and a thickness of 20 μm was fixed on the balance, and a line was drawn once while the writing pressure was controlled within the range of 3 N (306 gf) to 4 N (408 gf), which was measured by the balance. At this time, the state of the paraffin paper was observed.

[○]: No wrinkles occur on the paraffin paper.

[×]: wrinkles occur on the paraffin paper.

(c) Spreadability

Writing was carried out on a freesheet paper that was fixed on a balance by using oily and aqueous writing implements, and a line was drawn thereon once by using the products obtained according to examples and comparative examples of the present invention while the writing pressure was controlled such that the writing pressure was in the range of 3 N (306 gf) to 4 N (408 gf), which was measured by a balance. After 10 days, the spreadability of the written surface was observed by the naked eye.

[○]: No spreading occurs on the written surface.

[×]: Spreading occurs on the written surface.

(d) Transparency

Writing was carried out on a freesheet paper that was fixed on a balance by using the writing implements, and the contents obtained from examples and comparative examples of the present invention were put on the written surface. The shape of the written line was observed by the naked eye.

[○]: The shape of the written line can be confirmed.

[×]: the shape of the written line cannot be confirmed.

EXAMPLE 1

19.5 wt % of sodium stearate, 10.0 wt % of sodium laurate, 10.0 wt % of sodium myristate, 10.0 wt % of triethanolamine, 10.0 wt % of glycerine, 20.0 wt % of PO-40 as the hydrogenated glucose syrup, 20.0 wt % of liquid paraffin, and 0.5 wt % of Basic Red 1 were put in an agitator and agitated at 90° C. for 1 hour, and the resultant melted material was injected into a screw-type holder 3, cooled, and solidified to obtain a pink transparent solid marker according to Example 1 of the present invention.

EXAMPLE 2

19.5 wt % of sodium stearate, 10.0 wt % of sodium laurate, 10.0 wt % of sodium myristate, 10.0 wt % of triethanolamine, 10.0 wt % of glycerine, 20.0 wt % of HS-20 as the hydrogenated glucose syrup, 20.0 wt % of liquid paraffin, and 0.5 wt % of Basic Yellow 40 were put in an agitator and agitated at 90° C. for 1 hour, and the resultant melted material was injected into the screw-type holder 3, cooled, and solidified to obtain a yellow transparent solid marker according to Example 2 of the present invention.

COMPARATIVE EXAMPLE 1

19.5 wt % of sodium stearate, 10.0 wt % of sodium laurate, 10.0 wt % of sodium myristate, 30.0 wt % of triethanolamine, 10.0 wt % of glycerine, 20.0 wt % of liquid paraffin, and 0.5 wt % of Basic Red 1 were put in an agitator and agitated at 90° C. for 1 hours, and the resultant melted material was injected into a screw-type holder 3, cooled, and solidified to obtain a pink solid portrayal material according to Comparative Example 1 of the present invention.

In Comparative Example 1, the solid portrayal material was obtained by using the same method as the manufacturing method of Example 1, except that instead of the hydrogenated glucose syrup HS-20 according to Example 1 of the present invention, triethanolamine that was the transparency agent was added.

COMPARATIVE EXAMPLE 2

19.5 wt % of sodium stearate, 10.0 wt % of sodium laurate, 10.0 wt % of sodium myristate, 20.0 wt % of glycerine, 20.0 wt % of HS-20 as the hydrogenated glucose syrup, 20.0 wt % of liquid paraffin, and 0.5 wt % of Basic Yellow 40 were put in an agitator and agitated at 90° C. for 1 hours, and the resultant melted material was injected into a screw-type holder 3, cooled, and solidified to obtain a yellow solid portrayal material according to Comparative Example 2 of the present invention.

In Comparative Example 2, the solid portrayal material was obtained by using the same method as the manufacturing method of Example 1, except that instead of the triethanolamine that was the transparency agent according to Example 1 of the present invention, glycerine that was the subsidiary transparency agent was added.

COMPARATIVE EXAMPLE 3

20.0 wt % of sodium stearate, 15.0 wt % of C.I. Pigment Yellow 12, 55.0 wt % of water, and 10.0 wt % of propylene glycol were put in an agitator and agitated at 90° C. for 1 hours, and the resultant melted material was injected into a screw-type holder 3, cooled, and solidified to obtain a yellow solid portrayal material according to Comparative Example 3 of the present invention.

The evaluation results of the solid portrayal materials obtained from the examples and comparative examples are described in the following Table 1.

TABLE 1

| Evaluated items | Exemplary Embodiment 1 | Exemplary Embodiment 2 | Comparative Example 1 | Comparative Example 2 | Comparative Example 3 |
|---|---|---|---|---|---|
| (a) remnants after writing | ○ | ○ | ○ | ○ | X |
| (b) writing resistance | ○ | ○ | ○ | ○ | X |
| (c) transparency | ○ | ○ | ○ | X | X |
| (d) spreadability | ○ | ○ | X | ○ | X |

As seen from the Table 1, when the hydrogenated glucose syrup is not used, the spreadability is poor, and when the transparency agent is not used, the transparency is reduced.

In addition, according to the transparent solid marker of the present invention, excellent characteristics are confirmed in views of the remnants after writing, writing resistance, transparency, and spreadability.

While this invention has been described in connection with what is presently considered to be practical exemplary embodiments of the transparent solid marker, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A marker comprising a composition which comprises:
   10 to 70 wt % of a gel forming material that includes an alkali metal salt or ammonium salt of an aliphatic carboxylic acid having 8 to 36 carbon atoms;
   2 to 30 wt % of a transparency agent;
   2 to 30 wt % of a subsidiary transparency agent;
   1 to 30 wt % of hydrogenated glucose syrup;
   0.1 to 10 wt % of a pigment; and
   2 to 30 wt % of oil.

2. The marker of claim 1, wherein the transparency agent is an aliphatic amino alcohol.

3. The marker of claim 1, wherein the subsidiary transparency agent is a compound that is selected from saccharides, glycols, and polyalcohols.

4. The marker of claim 1, wherein the hydrogenated glucose syrup is obtained by decomposing starch using enzymes and reducing it by hydrogenation.

5. The marker of claim 1, wherein the pigment is a basic pigment.

6. The marker of claim 1, wherein the oil is one or more selected from silicon oil, an oily ester compound, vegetable tallow, and mineral oil, which are in a liquid state at 0° C. or higher.

7. The marker of claim 1, wherein the marker comprises a transparent and solid body.

8. The marker of claim 1, wherein the aliphatic carboxylic acid has 12 to 18 carbon atoms.

9. The marker of claim 1, wherein the gel forming material is 15 to 60 wt % of the composition.

10. The marker of claim 1, wherein the aliphatic carboxylic acid is selected from the group consisting of a capril acid, a peralgonic acid, a wandicanic acid, a lauric acid, a myristeric acid, a palmitic acid, a stearic acid, an arakinic acid, a behenic acid, a ligenoceric acid, a cerotic acid, a montanic acid, and a mericinic acid.

11. The marker of claim 1, wherein the alkali metal salt of the aliphatic carboxylic acid is selected from the group consisting of a lithium salt, a sodium salt, and a potassium salt.

12. The marker of claim 1, wherein the alkali metal salt of the aliphatic carboxylic acid is selected from the group consisting of a sodium myristerate, a sodium palmitate, and a sodium stearate.

13. The marker of claim 1, wherein the transparency agent comprises alkoxylated nitrogen.

14. The marker of claim 1, wherein the transparency agent is selected from the group consisting of ethanolamine, diethanolamine, triethanolamine, dimethylethanolamine, isopropanolamine, diisopropanolamine, triisopropanolamine, isobutanolamine, N,N-diethylethanolamine, N,N-dibutylethanolamine, N-methyl-N,N-diethanolamine, dimethylisopropanolamine, methylethanolamine, aminoethylethanolamine, ethyldiethanolamine and N,N-diisopropylethanolamine.

15. The marker of claim 1, wherein the transparency agent is 3 to 15 wt % of the composition.

16. The marker of claim 1, wherein the subsidiary transparency agent is 5 to 20 wt % of the composition.

17. The marker of claim 1, wherein the hydrogenated glucose syrup is 2 to 25 wt % of the composition.

18. The marker of claim 1, wherein the pigment is 0.2 to 8 wt % of the composition.

19. The marker of claim 1, wherein the oil is 5 to 20 wt % of the composition.

* * * * *

UNITED STATES PATENT AND TRADEMARK OFFICE
CERTIFICATE OF CORRECTION

PATENT NO.         : 7,682,437 B2
APPLICATION NO.    : 12/470235
DATED              : March 23, 2010
INVENTOR(S)        : Hak-Jae Kim et al.

It is certified that error appears in the above-identified patent and that said Letters Patent is hereby corrected as shown below:

At column 1, line 2, change "CROSS TO REFERENCE" to --CROSS-REFERENCE--.

At column 2, line 64, change "peralgonic" to --pelargonic--.

At column 2, line 66, change "ligenoceric" to --lignoceric--.

At column 3, line 3-4, change "myristerate," to --myristate,--.

At column 8, line 51, in Claim 10, change "peralgonic" to --pelargonic--.

At column 8, line 53, in Claim 10, change "ligenoceric" to --lignoceric--.

At column 8, line 61, in Claim 12, change "myristerate," to --myristate,--.

Signed and Sealed this

Second Day of November, 2010

David J. Kappos
*Director of the United States Patent and Trademark Office*